(12) United States Patent
Haddadi

(10) Patent No.: US 7,500,316 B2
(45) Date of Patent: Mar. 10, 2009

(54) CONTOUR READING DEVICE COMPRISING A FORCE SENSOR

(75) Inventor: Ahmed Haddadi, Draveil (FR)

(73) Assignee: Essilor International, Charlenton le Pont (FR)

( * ) Notice: Subject to any disclaimer, the term of this patent is extended or adjusted under 35 U.S.C. 154(b) by 154 days.

(21) Appl. No.: 11/597,502

(22) PCT Filed: May 20, 2005

(86) PCT No.: PCT/FR2005/001270

§ 371 (c)(1),
(2), (4) Date: Nov. 24, 2006

(87) PCT Pub. No.: WO2006/000673

PCT Pub. Date: Jan. 5, 2006

(65) Prior Publication Data

US 2008/0022539 A1    Jan. 31, 2008

(30) Foreign Application Priority Data

May 28, 2004    (FR) .................................. 04 05815

(51) Int. Cl.
*G01B 5/20*    (2006.01)
*G01B 7/28*    (2006.01)
(52) U.S. Cl. ................................. 33/200; 33/28; 33/507
(58) Field of Classification Search .................... 33/200, 33/28, 507
See application file for complete search history.

(56) References Cited

U.S. PATENT DOCUMENTS

| | | | |
|---|---|---|---|
| 4,051,601 A * | 10/1977 | Godot | 33/553 |
| 4,995,170 A * | 2/1991 | Brule et al. | 33/551 |
| 5,121,550 A * | 6/1992 | Wood et al. | 33/551 |
| 5,724,745 A * | 3/1998 | Brenner et al. | 33/503 |
| 5,881,467 A | 3/1999 | Clara et al. | 33/200 |
| 6,035,538 A * | 3/2000 | Miralles Bielsa et al. | 33/200 |
| 6,209,217 B1 * | 4/2001 | Tsuruta et al. | 33/554 |
| 6,473,977 B1 | 11/2002 | Kujawa | 33/28 |
| 6,618,952 B2 * | 9/2003 | Andrews et al. | 33/507 |
| 6,901,677 B2 * | 6/2005 | Smith et al. | 33/551 |
| 2005/0275802 A1 * | 12/2005 | Nauche et al. | 351/177 |

FOREIGN PATENT DOCUMENTS

DE    42 14 395    11/1993

* cited by examiner

*Primary Examiner*—G. Bradley Bennett
*Assistant Examiner*—Amy Cohen Johnson
(74) *Attorney, Agent, or Firm*—Young & Thompson

(57) ABSTRACT

A contour reading method for an item such as an eyewire for spectacles, the method using an appliance including a support for holding the item, and a rotary platform which is rotatably mounted in relation to the support about a rotational axis and carries a reading sub-set provided with a sensor consisting of a finger and a rod, the finger having a distal end. The distal end is displaced along the contour and successive positions thereof are detected. The method is characterized in that the displacement step includes a measuring step wherein the effort exerted between the platform and the rod is measured parallel to the rod, and a control step wherein the distance between the finger and the platform is controlled according to the effort in such a way that the intensity of the effort remains lower than a pre-determined threshold.

20 Claims, 5 Drawing Sheets

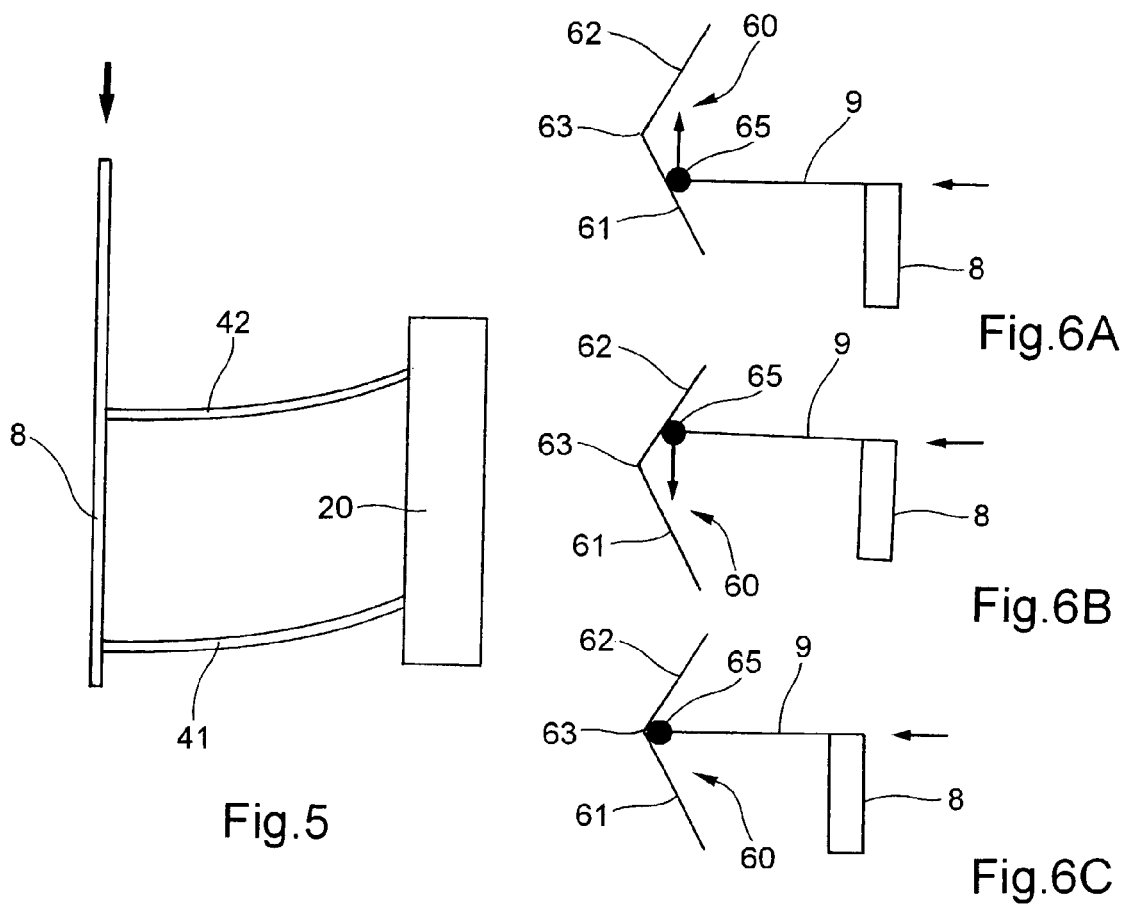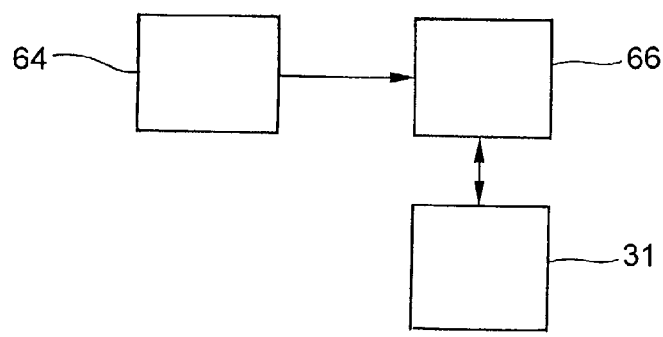

CONTOUR READING DEVICE COMPRISING A FORCE SENSOR

FIELD OF THE INVENTION

The invention relates to the general field of dimensional measurement devices used in the fabrication of eyeglasses adapted to a particular wearer.

The invention relates more particularly to a contour reading method and a contour reading device adapted, with the aid of a feeler, to determine the shape of an article disposed on a support. The palpated article is generally an eyeglass frame rim or an ophthalmic lens.

BACKGROUND OF THE INVENTION

A device of this kind is used, for example, to determine the shape of the bezel of a frame rim, i.e. the groove that runs around the interior of the frame rim and retains an ophthalmic lens in the frame rim. To this end, the feeler is inserted into the bezel and follows the contour of the bezel while the device measures the coordinates of the position of the feeler along its path, thereby storing a digital image of the contour of the bezel. An ophthalmic lens blank can then be trimmed to the dimensions of the bezel so that it can be inserted perfectly into the frame rim.

A contour reading device of the above kind is known from the document U.S. Pat. No. 5,121,550. The device includes a support for holding an article to be palpated. A circular platform is mounted to turn relative to the support and carries a reading subassembly that includes a feeler. The feeler includes a rod and a finger extending from said rod. The distal end of the finger is adapted to move along the contour.

The reading subassembly includes a slideway on which a mobile carriage attached to the feeler is mounted.

This device measures polar coordinates along the path of the feeler where the angular dimension ($\theta$) corresponds to the rotation of the rotary platform and the radial dimension ($\rho$) corresponds to the movement in translation of the carriage on the slideway.

The finger moves in the bottom of the bezel of the rim and remains in contact with the latter because of the effect of a radial force applied to hold the finger against the bezel.

The article to be palpated being in three dimensions, the feeler must be able to move along an axis (z) corresponding to a movement transverse to the plane comprising the dimensions ($\rho$, $\theta$).

These devices include a motor initially driving the feeler along the axis (z) until it faces the bezel. Once the finger has been brought into contact with the bezel, by movement in translation along the slideway, said motor is disengaged or passive so that, during the reading of the contour, movement along the axis (z) is unimpeded.

If the article to be read is a frame rim having moderate curvature, the movement of the feeler along the axis (z) is of small amplitude and the finger easily remains in contact with the bottom of the bezel.

On the other hand, in the case of frame rims with highly curved portions, where the amplitude along the axis (z) is therefore high, the free movement of the finger along the axis (z) makes it more difficult for the finger to remain in the bottom of the bezel.

To limit the risk of movement away from the bottom of the bezel, it is necessary to reduce the rotation speed when the finger includes a highly curved portion, for example.

There is also known from the document U.S. Pat. No. 6,325,700 a contour reading device including calculation means for predicting the amplitude of the contour to be read in three directions, and in particular along the axis (z), with the aim of preventing the finger moving away from the bottom of the bezel. These calculation means estimate the evolution along the axis (z) of the portion to be traveled as a function of the measured coordinates of the portion already traveled. A motor for positioning the feeler along the axis (z) is controlled as a function of the calculated estimate. The feeler is guided as it follows the contour but there is nothing to guarantee that the finger will remain in the bottom of the bezel.

SUMMARY OF THE INVENTION

The object of the invention is to provide a contour reading method for alleviating the drawbacks mentioned above at the same time as being particularly simple and convenient to use. Another object of the invention is to propose a reading device adapted to any type of contour suitable for the implementation of a method of this kind.

To this end, the invention proposes a contour reading method, for articles such as an eyeglass frame rim, wherein a device is used including a support for holding said article, a rotary platform mounted to rotate relative to the support about a rotation axis, this rotary platform carrying a reading subassembly which includes a feeler featuring a finger and a rod extending transversely to said finger, said finger having a distal end, said method including the step of displacing said distal end along said contour and of measuring successive positions of said distal end, characterized in that said displacement step includes the step of measuring the force exerted between the platform and the rod, parallel to the latter, and the step of controlling the distance between said finger and said platform as a function of said force so that the intensity of said force remains below a predetermined threshold.

Accordingly, the finger is at all times at a distance from the rotary platform corresponding to a particular force exerted by the article to be read on the feeler, which enables the finger to follow a predetermined path and in particular prevents the finger from dropping off the contour. Moreover, the force is measured in only one direction, which simplifies measurement.

The invention also proposes a contour reading device, for articles such as an eyeglass frame rim, including a support for holding said article, a rotary platform mounted to rotate relative to the support about a rotation axis, this rotary platform carrying a reading subassembly which includes a feeler featuring a finger and a rod extending transversely to said finger, said finger having a distal end adapted to be displaced along said contour, characterized in that said subassembly further includes a member, to which said rod is fixed, extending globally transversely to said rod, a drive motor of said member for controlling the distance between said finger and said platform, a force sensor disposed on said member to determine the force to which it is subjected in a direction parallel to said rod, and control means connected to said sensor and to said motor adapted to control said motor so that the intensity of said force remains below a predetermined threshold.

The position of the member relative to the rod enables use of the relatively large receiving space available under the platform. Moreover, the force sensor being away from the finger in this receiving space, it is rendered inaccessible from the outside so that it is protected from unintentional misadjustment by the user or from dust.

In one embodiment, said control means are adapted to control said motor so that the intensity of said force remains below a first threshold if the force is applied in a first sense and remains below a second threshold if the force is applied in a second sense opposite the first sense. If the feeler is reading a frame rim, the finger is then at all times very close to the bottom of the bezel where there is no force and reading can be effected at high speed.

It will be noted that there is already known from the document U.S. Pat. No. 5,341,079 a copying machine including a feeler head and a finger, in which machine the feeler head includes a force sensor for determining the force applied to the finger by the groove. This sensor measures microdisplacements of the finger in three directions, taking the feeler head as reference, these microdisplacements corresponding to the forces applied to the finger by the groove.

The document U.S. Pat. No. 5,477,119 describes a groove tracing device including a feeler head of the above kind in which, as a function of the sensed force, the means for driving the feeler head are commanded to zero the force in a direction transverse to the finger and to make the resultant of the force along the main axis of the finger equal to a predetermined value. The finger then remains centered in the groove and in contact with the groove bottom. The device is furthermore provided with a position sensor for sensing the position of the feeler along the contour in three directions. The position is measured with the fixed support of the device as a reference.

Apart from the positioning of the force sensor at the distal end, where it is particularly exposed, whereas it should have a small volume, this sensor measures the forces in three directions and adjust the position of the feeler head in these three directions, which is relatively complex (the device according to the invention is capable of achieving the same result with only one direction).

According to other implementation features that are particularly simple and convenient both in terms of fabrication and in terms of use:

said member is a first support member, the subassembly further including a second support member projecting transversely relative to said platform and on which the first support member is mounted in translation in a direction parallel to the rotation axis; and, where applicable the rotary platform includes an opening through which said rod extends, said finger being situated on a first side of said platform whereas said second support member, said first support member and a proximal end of said rod opposite said finger are situated on a second side of said platform; and/or the second support member includes a support shaft; and/or the first support member is a support arm including a plate having two ends from which two parallel blades extend transversely, each blade being deformable parallel to said rotation axis, and a sleeve extending between two ends of the blades opposite the plate, said sleeve being adapted to grip said proximal end of said rod; and, where applicable each blade has at one of its ends, opposite the plate, a circular opening adapted to receive said rod gripped in said sleeve; and/or said second support member includes a support shaft and said support arm includes a ring centered on said support shaft via a ball bush enabling said translation of said ring relative to said support shaft; and, where applicable said drive motor includes a pinion meshing with a rack fastened to said ring; and/or said drive motor includes a coder for measuring the position of the first support member relative to the second support member; and/or said first member is further mounted to turn about said second member; and/or said force sensor includes a detection cell and a flag mounted face to face; and, where applicable said detection cell is an optoelectronic cell; and/or said first support member is a support arm including a plate having two ends from which two parallel blades extend transversely, said detection cell and said flag being situated between the two blades; and, where applicable the detection cell and the flag are fixedly mounted on the plate and on a sleeve extending between two ends of the blades opposite the plate, respectively, the subassembly including a signal processing unit connected to said drive motor, the cell including means for detecting the position of the flag relative to itself and means for sending a signal to said processing unit as a function of said position;

said feeler is mobile both parallel to said rotation axis and transversely to said rotation axis.

BRIEF DESCRIPTION OF THE DRAWINGS

The characteristics and advantages of the invention will emerge from the following description, given by way of preferred example, with reference to the appended drawings, in which:

FIG. 5 is a diagrammatic view of the rod and of the blades of the support arm, in a situation in which a force is applied to the feeler;

FIGS. 6a to 6c are diagrammatic representations of three configurations of the orientation of the forces operative on the feeler, the finger and the groove as a function of the position of the finger in the groove; and FIG. 7 is a theoretical diagram of the control of the position of the feeler.

DETAILED DESCRIPTION OF THE PREFERRED EMBODIMENTS

Figure 1:
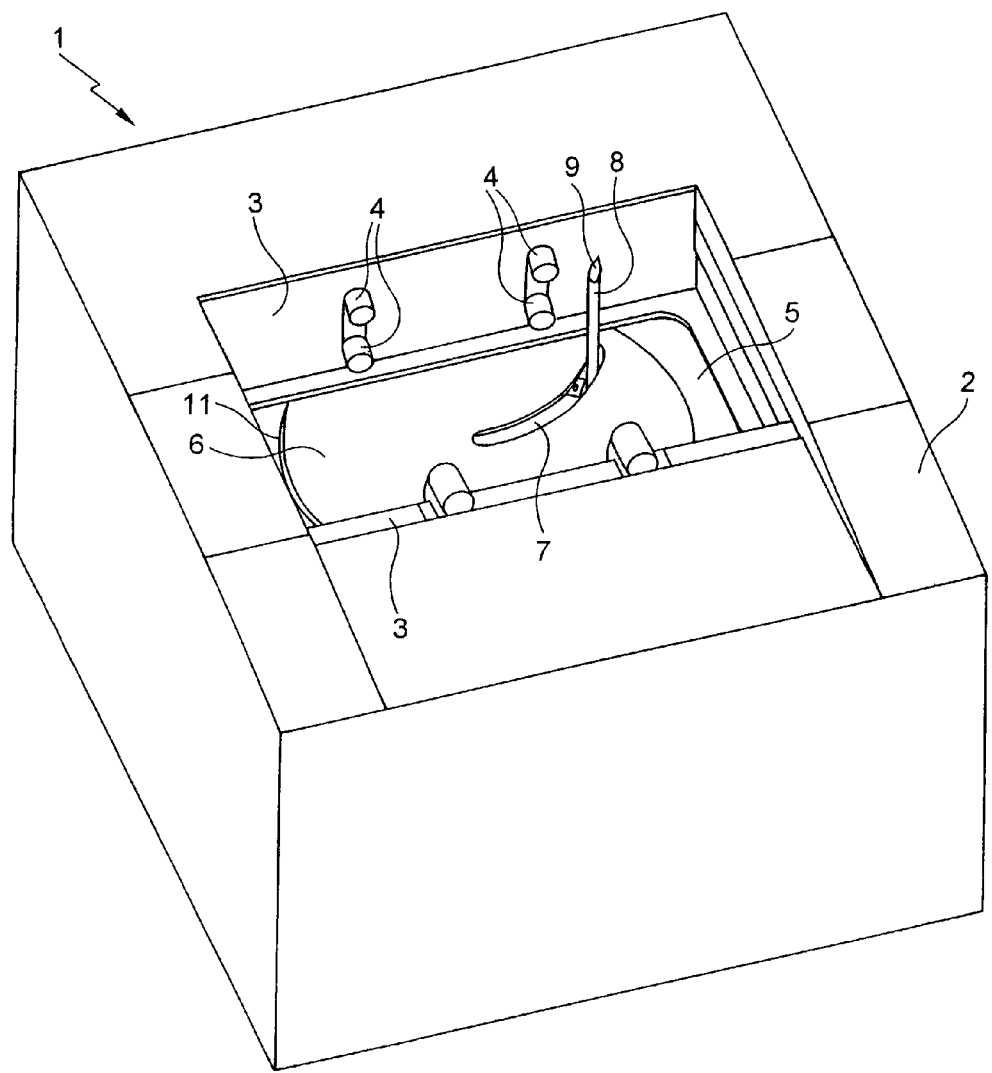
FIG. 1 is a perspective view of a contour reading device according to the invention.

FIG. 1 is a general view of a contour reading device 1 as seen by its user. This device 1 includes an upper cover 2 covering the whole of the device except for an upper central portion.

A rotary platform 6 is mounted to rotate relative to the chassis 5 of the device 1. This rotary platform 6 includes an oblong opening 7 of circular arc shape through which projects a feeler 8 including a rod 12 provided at its distal end with a finger 9.

The device 1 from FIG. 1 is intended to receive a frame 10.

Figure 2:
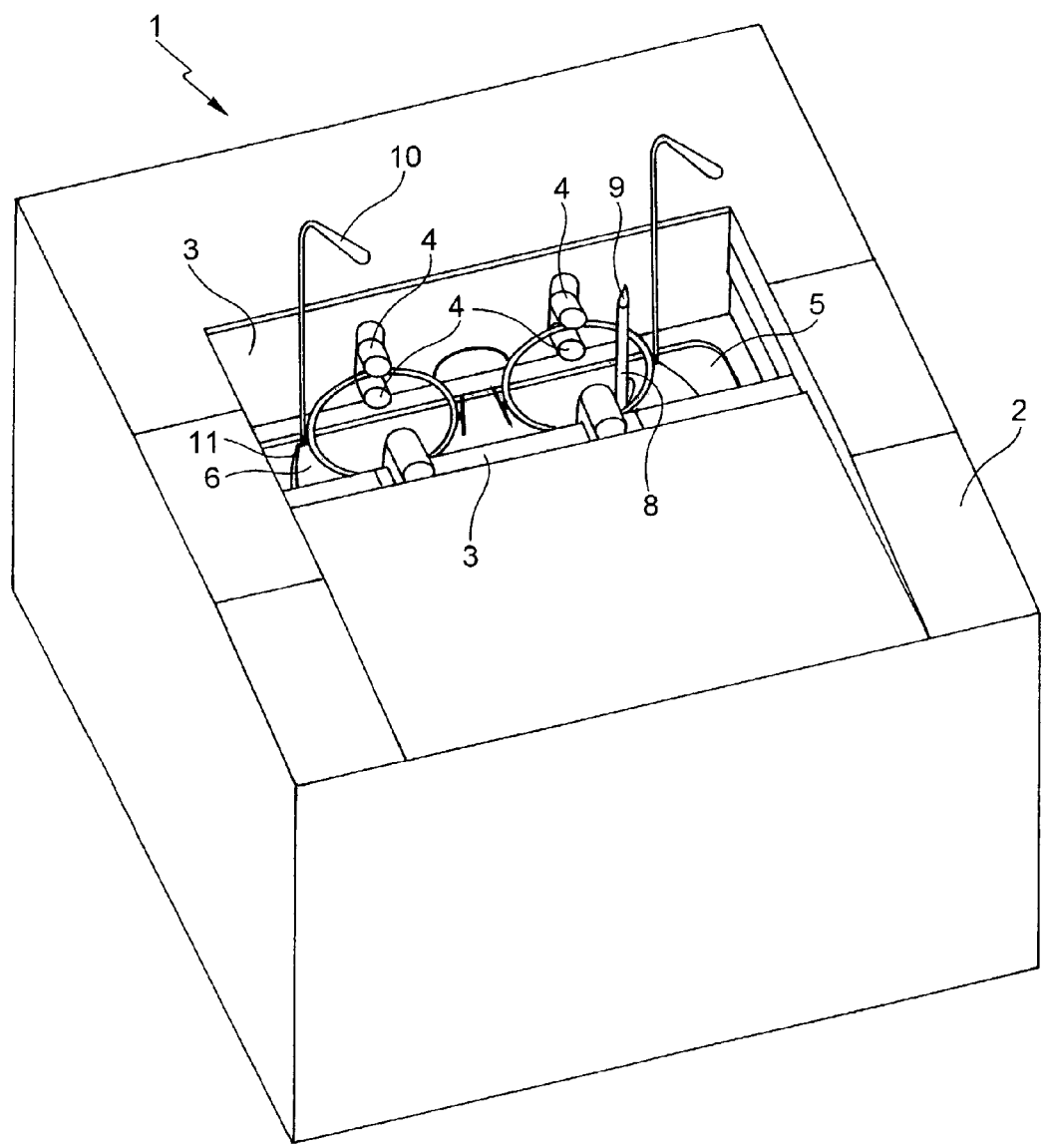
FIG. 2 is similar to FIG. 1, the contour reading device receiving an eyeglass frame whereof the shape of the rims is to be read by the feeler.

As seen in FIG. 2, the device 1 includes a device for gripping the frame 10 featuring two parallel jaws 3 and four clamps. Each clamp includes two studs 4 and is situated on one jaw 3 facing a clamp of the other jaw 3.

At least one of the jaws 3 is adapted to move towards or away from the other one to grip the frame 10. In the position with the frame 10 gripped, the clamps are situated face-toface on each rim, in a direction that corresponds to a vertical direction when the frame is being warm and a horizontal direction when the frame is placed in the device 1. The studs 4 of the same clamp may be moved towards each other to clamp the rims and hold the frame 10 for reading.

In FIG. 2, the jaws 3 have been moved towards each other to hold the frame 10 horizontal. The studs 4 have been closed onto the frame rims. Each of the rims of the frame 10 is therefore ready to be palpated along a path starting with the insertion of the feeler at a predetermined location situated between two studs 4 and then along the bezel of the frame 10 to cover the whole of the circumference of the frame rim.

Note that in this example the machine 1 is equipped with jaws adapted to hold a frame but that any other gripping device may be employed, for example a clamp for holding an ophthalmic lens whose external contour must be read.

The chassis 5 takes the form of a support table in which there is a circular cutout 11 of slightly larger diameter than the rotary platform 6. The circular cutout 11 receives the rotary platform 6, which is guided by three guide rollers (not visible) regularly disposed along its periphery.

Alternatively, the rollers are driven by a motor-coder (not shown) enabling controlled rotation of the rotary platform 6 and reading of its angular position at any time.

The circular-arc-shaped opening 7 has a length approximately corresponding to the radius of the rotary platform 6 and extends between the center of the rotary platform 6 and its periphery.

Figure 3:
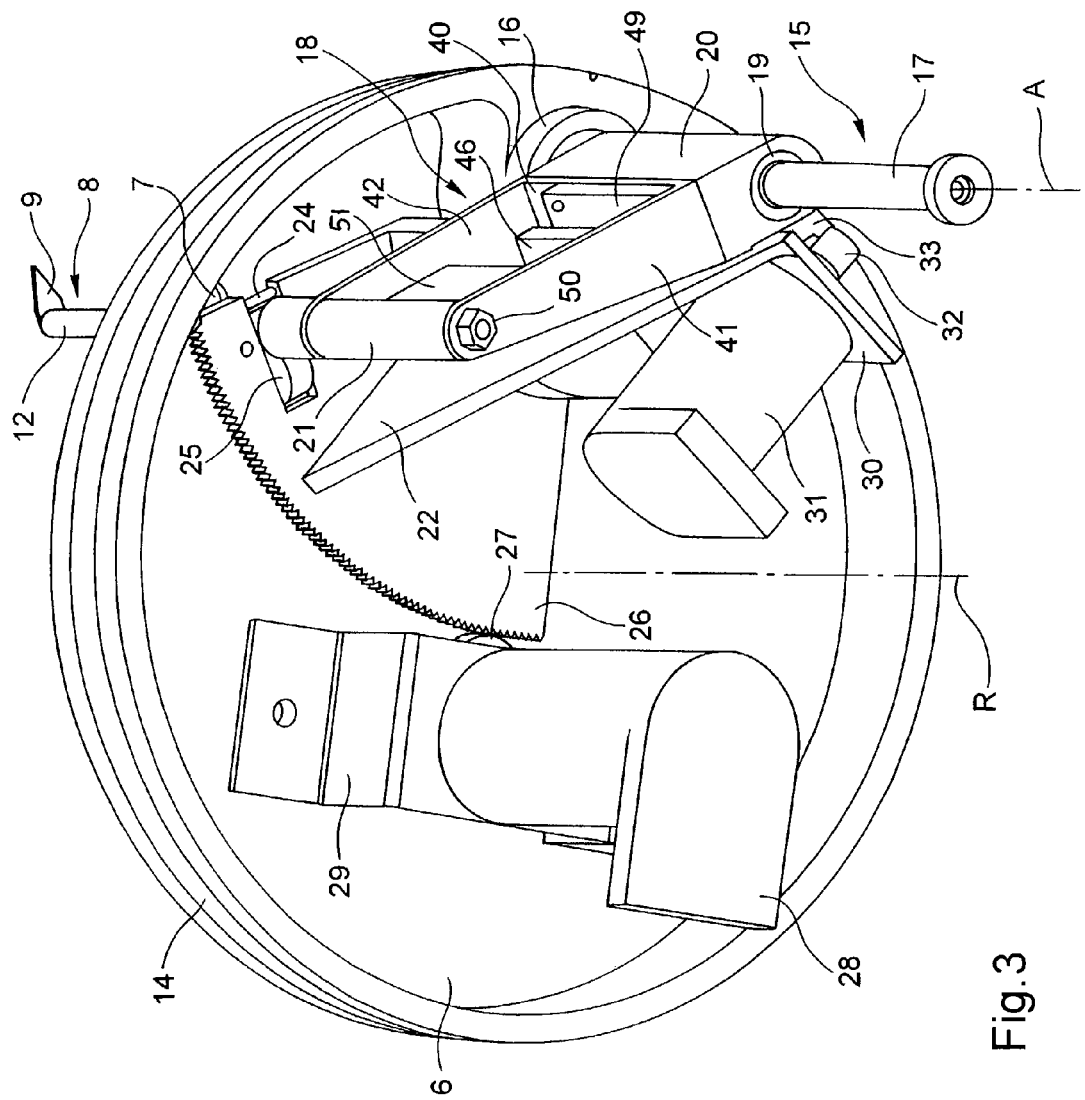
FIG. 3 is a perspective view from below of the rotary platform showing the reading subassembly carried by the rotary platform.

Also, the opening 7 is centered with respect to an axis A (FIG. 3).

As seen in FIG. 3, a groove 14 is provided on the edge of the rotary platform 6, over the whole of its circumference. This groove 14 is used to retain and to drive the platform 6 relative to the chassis 5, thanks to the motorized rollers.

The rotary platform 6 carries a reading subassembly 15 including a bearing 16 on which is mounted a support shaft 17 fixed to the rotary platform 6 by a rivet (not visible). This shaft 17 is centered on the axis A.

A support arm 18 is mounted on the support shaft 17 by means of a ball bush 19. The support arm 18 has at one of its ends a ring 20 surrounding the ball bush 19 and the support shaft 17, the ball bush 19 enabling the support arm 18 to move in rotation about the axis A and to move in translation along that axis.

At its end opposite the ring 20, the support arm 18 includes a cylindrical sleeve 21 in which the rod 12 is gripped so that it is parallel to the support shaft 17.

Figure 4:
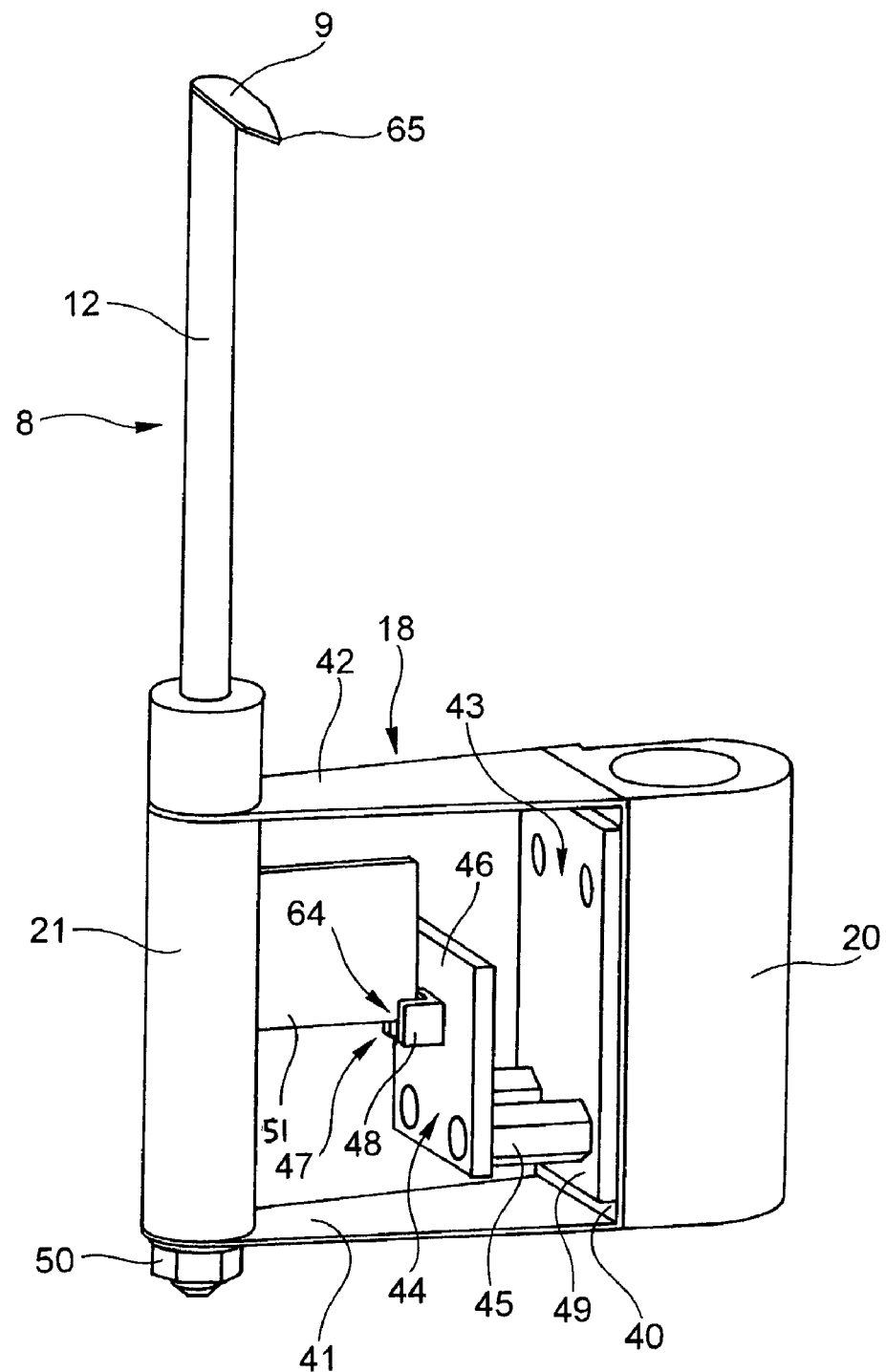
FIG. 4 is a perspective view of a portion of the reading subassembly including the feeler, the support arm and the force sensor.

The support arm 18 is described next with reference to FIG. 4.

The support arm 18 is a globally square component. At the two ends of a substantially rectangular plate 40 there are two identical transversely extending blades 41, 42.

Here each blade 41, 42 is triangular and has a rounded end opposite the plate 40. At this end, each blade 41, 42 has a circular opening (not shown) intended to receive the sleeve 21 gripping the rod 12.

The plate 40 carries a reinforcing plate 49 fixed to the plate 40 by two pairs 43, 44 of screws. The pairs 43, 44 of screws also fix the plate 40 to the ring 20. A first pair 43 comprises two screws flush with the surface of the plate 40.

The second pair 44 comprises two longer screws each of which extends transversely to the plate 40 through a sheath 45 to fix a cell support 46 to its surface opposite the plate 40 and parallel to the plate 40. The support 46 carries an opto-electronic cell 47 having two walls 48 parallel to each other and transverse to the blades 41, 42 and to the plate 40. This cell 47 is adapted to sense the position of a flag 51 between its two walls 48 by measuring a luminous flux. One of the walls 48 includes an optical emitter and the other wall includes an optical receiver, the receiver producing an output signal having a value that varies as a function of the quantity of light received from the emitter. The blades 41, 42, the cell 47 and the flag 51 form a force sensor 64. The electrical signal is transmitted by signal sending means (not visible) from the cell 47 to a motor-coder 31 described hereinafter. The sending means may be a radio sender, a connecting wire, etc.

The feeler 8 includes the feeler rod 12 carrying the finger 9 at its distal end opposite the arm 18. The rod 12 is centered and fixed relative to the two openings by the sleeve 21 that surrounds it between the two openings and extends a short distance towards the finger 9. The rod 12 is fixed at its proximal end, opposite the finger 9, to the opening of the corresponding blade 41 by a nut and bolt 50.

The sleeve 21 carries between the two blades 41, 42 the flag 51, which extends so that one of its corners occupies a portion of the space between the two walls 48.

By virtue of its shape, each blade 41, 42 has an overall stiffness. Nevertheless, each blade 41, 42 has slight flexibility so as to be able to curve in a direction parallel to the rod 12.

The presence of the two blades 41, 42 retaining the feeler 8 provides transverse flexibility of the support arm 18. Moreover, retaining the feeler 8 at the level of the two openings avoids the pivoting of the feeler 8 that could occur if the latter were on a single blade.

Thus, the force sensor 64 is positioned in an area of the device 1 featuring a relatively large receiving space. When the device 1 is ready for use, the force sensor 64 is not accessible from the outside and is therefore protected from dust and also from intervention, in particular involuntary intervention, by the user of the device 1, which prevents any misadjustment of the sensor 64.

The fact that the support arm 18 is mounted to turn about the axis A enables the feeler 8 to move along the opening 7 in a circular arc in a plane transverse to the rotation axis (R) of the rotary platform 6, that rotation axis (R) here being parallel to the axis A. Moreover, the feeler 8 can effect an entry/exit movement of the finger 9 relative to the surface of the rotary platform 6 if the support arm 18 is caused to slide along the axis A. When the device is in operation, only the finger 9 and a portion of the rod 12 project above the platform, the remainder of the subassembly 15 being situated on its other side.

The reading subassembly 15 also includes a guide arm 22 attached to the base of the shaft 17 via a bearing (not visible) allowing the guide arm 22 to move only in rotation about the axis A. This guide arm 22 has a length sufficient to reach the opening 7 and includes a fixed rest 24 and a bearing 25 facing the opening 7.

The fixed rest 24 and the bearing 25 are disposed side by side with a mutual separation substantially corresponding to the thickness of the rod 12.

By virtue of the rotational mounting of the guide arm 22 on the support shaft 17, the fixed rest 24 and the bearing 25 remain facing the opening 7 whatever the angular position of the guide arm 22 about the axis A. The support arm 18 and the guide arm 22 are disposed so that the rod 12 is gripped between the fixed rest 24 and the bearing 25. Angular movements of the support arm 18 and the guide arm 22 about the axis A are therefore effected conjointly.

The guide arm 22 further includes a toothed semicircular portion 26 of arcuate shape centered on the axis A. The teeth of the portion 26 mesh with an intermediate pinion 27 that itself meshes with the pinion (not visible) of a motor-coder 28 mounted on a yoke 29 fixed to the rotary platform 6. To make the drawings clearer, the teeth of the intermediate pinion 27 are not represented.

The guide arm 22 further includes a vertical yoke 30 parallel to the axis A, to which is fixed a motor-coder 31 the pinion 32 whereof meshes with a rack 33 fixed to the ring 20 of the support arm 18. The rack 33 is parallel to the axis A. For the same reasons of clarity as before, the teeth of the pinion 32 are not represented.

The motor-coder 31 includes control means (not visible) adapted to receive an electrical signal and selectively to command movement of the pinion 32 as a function of that signal.

The coders of the motor-coders 28, 31 measure the position of the feeler 8 in the radial and vertical directions.

As seen in FIGS. 5 and 6a to 6c, during reading, the feeler 8 is liable to exert a contact pressure on the contour. This pressure results from a radial force applied by means of the motor-coder 28.

Here the contour to be read is a bezel 60 of a frame rim. The bezel 60 takes the form of a V-shaped groove with two branches 61, 62. The finger of the feeler moves in the bezel on the two branches 61, 62. The junction of the branches 61, 62 is referred to as the bottom 63 of the bezel 60.

The direction parallel to the axis A and to the feeler rod 12 is referred to as the direction along z and the direction of the radius of curvature of the bezel 60 is referred to as the direction along ρ.

The contact pressure is applied along ρ, which generates a force along z applied by the bezel 60 to the tip 65 of the finger 9. When the tip 65 is in contact with the branch 61, the force along z is directed in a first sense, towards the branch 62. When the tip 65 is in contact with the branch 62, the force along z is directed in a second sense, towards the branch 61. When the tip is against the bottom 63 of the bezel 60, the resultant of the force applied to the bezel in the direction along z is zero.

FIG. 5 shows the state of the blades 41, 42 when the tip 65 is situated against the branch 62. The force applied to the tip 65 in the direction along z is transmitted to the remainder of the feeler 8, which is reflected in deformation of the blades 41, 42 fastened to the feeler 8.

The flag 51 fastened to the feeler 8 effects a microdisplacement in front of the stationary cell 47 resulting from the deformation of the blades 41, 42. A change of luminous flux is detected by the cell 47.

As shown in FIG. 7, the sensor 64 is connected by a cable to a processing unit 66 adapted to receive an electrical signal emitted by the sensor 64 and corresponding to the luminous flux. The processing unit 66 is itself connected by a cable to the motor 31. The electrical connection between the processing unit 66 and the motor 31 is a bidirectional connection.

The processing unit 66 processes the signal received from the sensor 64 by comparing it to a predetermined set point, corresponding here to a zero value of the force, and then sends a corresponding output signal to the motor 31. On the other hand, the motor 31 sends the processing unit 66 a signal corresponding to the position of the feeler 8 along the axis (z).

In concrete terms, the detection of a microdisplacement of the flag 51 relative to a reference position leads to the cell 47 of the sensor 64 sending the processing unit 66 a signal corresponding to the microdisplacement and in particular to its orientation. The processing unit 66 effects a comparison with a predetermined set point held in the processing unit 66. Provided that the value is greater than the set point, the processing unit 66 commands the motor 31 to activate the pinion 32.

The pinion 32 then meshes with the rack 33 in the direction opposite to the microdisplacement of the feeler 8, i.e. in the direction reducing the force on the finger 9 along the axis (z).

More generally, the reading of a contour may start with the placing of the feeler finger 9 against the contour, disposing it at the required height by means of the motor 31 and maintaining the contact between the finger 9 and the contour by means of the motor 28, which is controlled so that the feeler 8 exerts a constant contact pressure against the contour. It will be noted here that retaining the finger 9 in the bottom 63 of the bezel 60 reduces the value of the applied radial force compared to the applied radial force in prior art devices. It will also be noted that it suffices to maintain the pressure in the radial direction constant.

The rollers are then driven so that the rotary platform 6 performs a complete turn, corresponding to a complete circuit of the contour to be palpated.

Also, the rotation speed of the rotary platform 6 may be relatively fast.

During this rotation, the sensor 64 measures the force exerted on the arm 18 corresponding to the force applied by the article to the finger 9. The motor 31 controls the distance between the finger 9 and the platform 6 as a function of the force by driving the feeler 8.

More precisely, the motor-coder 31 tracks the set point coming from the processing unit 66. If the force corresponds to the set point, the motor operates only as a coder for measuring the successive positions of the support arm 18 along the axis A (corresponding to the height of the finger 9 relative to the platform 6) while the finger 9 is following the shape in which it is engaged.

According to a variant, a non-zero threshold value of the force sensed by the cell 47 is defined below which the tip 65 is considered to be sufficiently close to the bottom 63 of the bezel 60 even if the tip 65 is not exactly at the bottom of the bezel.

According to another variant, two distinct sensed force threshold values are defined. When the finger is in contact with the branch 62, i.e. when the force is directed towards the branch 61, the force threshold value not to be exceeded is a first of the preceding two values. When the finger is in contact with the branch 61, it is the second threshold value that is taken into account.

According to an embodiment not shown, and subject to the necessary adaptations, the invention applies equally to reading a lens: if the lens includes a groove, the finger is then identical to that previously described for a frame rim. If the lens has a convex profile, the back of the feeler then features a recess. The recess also receives forces in the direction z that are sensed by a force sensor as previously described.

According to embodiments that are not shown, the force sensor is a strain gauge or a piezo-electric spacer.

One embodiment of the device according to the invention has been described, but the invention nevertheless applies equally to devices featuring different embodiments of the kinematics of the feeler, the necessary adaptations of the components enabling the various movements then being effected.

The invention claimed is:

1. Contour reading method, for article such as an eyeglass frame rim, wherein a device is used including a support (3, 4) for holding said article, a rotary platform (6) mounted to rotate relative to the support (3, 4) about a rotation axis (R) this rotary platform (6) carrying a reading subassembly (15) which includes a feeler (8) featuring a finger (9) and a rod (12) extending transversely to said finger, said finger (9) having a distal end, said method including the step of displacing said distal end along said contour and of measuring successive positions of said distal end, characterized in that said displacement step includes the step of measuring the force exerted between the platform (6) and the rod (12), parallel to the latter, and the step of controlling the distance between said finger (9) and said platform (6) as a function of said force so that the intensity of said force remains below a predetermined threshold.

2. A contour reading device, for an article such as an eyeglass frame rim, said device being suitable for the implementation of a contour reading method, comprising displacing a distal end of a finger of a feeler along said contour and measuring successive positions of said distal end, measuring force exerted between a platform and a rod parallel to the platform, which carries a reading sub-assembly that includes the feeler, and controlling a distance between the finger and the platform as a function of the force so that the intensity of the force remains below a predetermined threshold, said device a support for holding said article, a rotary platform mounted to rotate relative to the support about a rotation axis, said rotary platform carrying a reading subassembly which includes a feeler having a finger and a rod extending transversely to said finger, said finger having a distal end adapted to be displaced along said contour, wherein said subassembly further includes a member, to which said rod is fixed, extending globally transversely to said rod, a drive motor of said member for controlling the distance between said finger and said platform, a force sensor disposed on said member to determine the force to which it is subjected in a direction parallel to said rod, and control means connected to said sensor and to said motor adapted to control said motor so that the intensity of said force remains below a predetermined threshold.

3. The device according to claim 2, wherein said control means are adapted to control said motor so that the intensity of said force remains below a first threshold if the force is applied in a first direction and remains below a second threshold if the force is applied in a second direction opposite the first direction.

4. Device according to claim 3, characterized in that said member is a first support member (18), the subassembly (15) further including a second support member (17) projecting transversely relative to said platform (6) and on which the first support member (18) is mounted in translation in a direction parallel to the rotation axis (R).

5. Device according to claim 2, characterized in that said member is a first support member (18), the subassembly (15) further including a second support member (17) projecting transversely relative to said platform (6) and on which the first support member (18) is mounted in translation in a direction parallel to the rotation axis (R).

6. Device according to claim 5, characterized in that the rotary platform (6) includes an opening (7) through which said rod (12) extends, said finger (9) being situated on a first side of said platform whereas said second support member (17), said first support member (18) and a proximal end of said rod (12) opposite said finger are situated on a second side of said platform (6).

7. Device according to claim 6, characterized in that the second support member includes a support shaft (17).

8. Device according to claim 5, characterized in that the second support member includes a support shaft (17).

9. Device according to claim 5, characterized in that the first support member is a support arm (18) including a plate (40) having two ends from which two parallel blades (41, 42) extend transversely, each blade (41, 42) being deformable parallel to said rotation axis (R), and a sleeve (21) extending between two ends of the blades opposite the plate (40), said sleeve (21) being adapted to grip said proximal end of said rod (12).

10. Device according to claim 9, characterized in that said second support member includes a support shaft (17) and said support arm (18) includes a ring (20) centered on said support shaft via a ball bush (19) enabling said translation of said ring (20) relative to said support shaft (17).

11. Device according to claim 10, characterized in that said drive motor (31) includes a pinion (32) meshing with a rack (33) fastened to said ring (20).

12. Device according to claim 9, characterized in that each blade (41, 42) has at one of its ends, opposite the plate (40), a circular opening adapted to receive said rod (12) gripped in said sleeve (21).

13. Device according to claim 12, characterized in that said second support member includes a support shaft (17) and said support arm (18) includes a ring (20) centered on said support shaft via a ball bush (19) enabling said translation of said ring (20) relative to said support shaft (17).

14. Device according to claim 5, characterized in that said drive motor (31) includes a coder for measuring the position of the first support member (18) relative to the second support member (17).

15. Device according to claim 5, characterized in that said first member (18) is further mounted to turn about said second member (17).

16. Device according to claim 2, characterized in that said force sensor (64) includes a detection cell (47) and a flag (51) mounted face to face.

17. Device according to claim 16, characterized in that said detection cell (47) is an optoelectronic cell.

18. Device according to claim 16, characterized in that said first support member is a support arm (18) including a plate (40) having two ends from which two parallel blades (41, 42) extend transversely, said detection cell (47) and said flag (51) being situated between the two blades (41, 42).

19. Device according to claim 18, characterized in that the detection cell (47) and the flag (51) are fixedly mounted on the plate (40) and on a sleeve (21) extending between two ends of the blades (41, 42) opposite the plate, respectively, the subassembly (15) including a signal processing unit (66) connected to said drive motor (31), the cell (47) including means for detecting the position of the flag (51) relative to itself and means for sending a signal to said processing unit (66) as a function of said position.

20. Device according to claim 2, wherein said feeler is mobile both parallel to said rotation axis and transversely to said rotation axis.

* * * * *

UNITED STATES PATENT AND TRADEMARK OFFICE
CERTIFICATE OF CORRECTION

| | | |
|---|---|---|
| PATENT NO. | : 7,500,316 B2 | Page 1 of 1 |
| APPLICATION NO. | : 11/597502 | |
| DATED | : March 10, 2009 | |
| INVENTOR(S) | : Ahmed Haddadi | |

It is certified that error appears in the above-identified patent and that said Letters Patent is hereby corrected as shown below:

Title page, item should read as follows

--(73)  Assignee: Essilor International, (Compagnie Generale d'Optique), Charenton Le Pont (FR)--.

Signed and Sealed this

Twenty-eighth Day of April, 2009

JOHN DOLL
*Acting Director of the United States Patent and Trademark Office*